United States Patent
Kurr et al.

[11] Patent Number: 5,438,969
[45] Date of Patent: Aug. 8, 1995

[54] HEATING MODULE FOR AN INTERNAL COMBUSTION ENGINE

[75] Inventors: Klaus Kurr, Weinheim; Karl-Heinz Spies, Birkenau; Uwe Meinig, Weinheim, all of Germany

[73] Assignee: Firma Carl Freudenberg, Weinheim/Gergstr., Germany

[21] Appl. No.: 235,350

[22] Filed: Apr. 29, 1994

[30] Foreign Application Priority Data
Apr. 30, 1993 [DE] Germany .............. 43 14 283.4

[51] Int. Cl.⁶ .................. F02M 31/02; F02M 31/12; F02M 31/10
[52] U.S. Cl. ............................................ 123/549
[58] Field of Search .......... 123/549, 543, 545, 547, 123/552, 553; 219/205, 206, 528, 543, 544, 549; 427/507; 428/323; 29/620

[56] References Cited

U.S. PATENT DOCUMENTS

| | | | |
|---|---|---|---|
| 3,099,578 | 7/1963 | Hunter | 428/323 |
| 3,350,777 | 11/1967 | Mendelsohn | 29/620 |
| 3,534,148 | 10/1970 | Bange | 427/507 |
| 4,251,792 | 2/1981 | Ball | 219/206 |
| 4,378,001 | 3/1983 | Takeda et al. | 123/549 |
| 4,793,317 | 12/1988 | Grenet | 123/549 |
| 5,054,459 | 10/1991 | Reimer et al. | 123/549 |
| 5,172,673 | 12/1992 | Pelgrim et al. | 123/549 |
| 5,179,927 | 1/1993 | Henke et al. | 123/549 |
| 5,297,530 | 3/1994 | Kaneko et al. | 123/549 |
| 5,297,531 | 3/1994 | Akase | 123/549 |

FOREIGN PATENT DOCUMENTS

| | | | |
|---|---|---|---|
| 2597694 | 10/1987 | France | 123/549 |
| 469261AL | 5/1991 | Germany . | |
| 54-75637 | 6/1979 | Japan | 123/549 |

Primary Examiner—Henry C. Yuen
Assistant Examiner—M. Macy
Attorney, Agent, or Firm—Kenyon & Kenyon

[57] ABSTRACT

A heating module for an internal combustion engine with external mixture formation and fuel injection and at least one intake port and one injection nozzle is disclosed. An electrically heatable heating element, which can be surrounded by flow on all sides, is arranged in the intake port, the heating element being capable of connection to an electrical power supply by means of terminals. The heating element is formed by a laminated composite part which has a trough-shaped cross section transverse to the direction of flow.

13 Claims, 6 Drawing Sheets

HEATING MODULE FOR AN INTERNAL COMBUSTION ENGINE

BACKGROUND OF THE INVENTION

1. Field of the Invention

The present invention relates to a heating module for an internal combustion engine having at least one intake port. The heating module includes an electrically heatable heating element which is surrounded by flow on all sides and is arranged in the intake port and capable of connection to an electrical voltage source by connecting terminals.

2. Description of Related Art

A heating module is known from EP-A-0 469 261. The heating element is plate-shaped and directed at an acute angle towards the injected jet of fuel which results in a small resistance to flow within the intake port. Due to the flat heating surface of this device it is not possible to prevent disadvantageous wetting of the walls of the intake port, which are still cold during the warm-up phase. Injected fuel components, which are not completely atomized and are formed by larger drops which cannot spontaneously follow the flow of the air due to their relatively large mass moment of inertia, slide without vaporization over the flat surface of the heating element into the intake port. This result is not satisfactory with a view towards good cold-running properties of the downstream internal combustion engine.

SUMMARY OF THE INVENTION

It is the object of the present invention further to develop a heating module for an internal combustion engine in such a manner that during the warm-up phase of the internal combustion engine, wetting of the cold intake manifold wall with fuel, and thus the formation of a fuel film, is prevented, and there is fed to the internal combustion engine only a fuel-air mixture with fuel components which are completely vaporized.

It is provided within the scope of the present invention that the heating element be formed by a laminated composite part which has, transverse to the direction of flow, a trough-shaped cross section. In this way, excess fuel in the air-fuel mixture can be reduced even when the engine has not yet warmed up, while the engine retains good dynamic running properties so that both the fuel consumption and the hydrocarbon and carbon monoxide emissions are reduced. It is advantageous that the composite part has only a slight thickness of material, which is of importance in presenting the smallest possible flow resistance within the intake port and low thermal inertia. The trough-like cross section has the result that only, incompletely atomized portion of the fuel, formed by larger drops, impinges on the heating element and is reliably held on the heating element until it vaporizes due to the increased temperature on the heating element. In this way, the wall which is cold during the warm-up phase and which defines the intake port is not wetted by unvaporized fuel components. The cold running behavior of the internal combustion engine, and in particular the emissions produced, are favorably influenced thereby.

In accordance with one advantageous embodiment, the heating element can comprise a surface of metallic material, a flexible printed conductor of electrically conductive material being arranged between the trough-shaped surfaces and the printed conductor and the metallic material being adhesively connected to each other. It is advantageous for the printed conductor to be completely surrounded by the metallic material which has a good thermal conductivity and is thus reliably protected. This results in uniformly good properties in use during a long service life. The adhesive connection between the printed conductor and the metallic material which forms the surface can thus be effected by a film which is provided with adhesive on both sides and which only insignificantly influences the heat transfer from the printed conductor to the surface of the heating element.

The metallic material can be formed by two aluminum sheets which each have a thickness of 0.2 to 1.0 mm, and preferably 0.3 to 0.7 mm. The production of the heating element can take place by a simple deformation of the originally flat composite part. The use of aluminum sheets is advantageous with a view towards good thermal conduction and availability at a low price. Other materials, for instance copper sheets, which also exhibit good thermal conductivity can also be used.

The aluminum sheets can be provided with integrally formed holding webs which are mounted on the wall defining the intake port. While taking simultaneously into account a shape which is favorable for flow, the holding ribs are guided in such a manner to the region at which they are clamped that, with respect to the main direction of vibration caused by inertial forces, there results in a large surface moment of inertia. As a result, there results a great stiffness and, in combination with the small mass of the heating element, a high natural vibration frequency. It is furthermore advantageous that due to the fastening of the holding ribs on the wall of the intake port, there can be achieved a thermal coupling of the heating element with the intake manifold or the cylinder head via the suspension in the port. In this way, overheating of the heating element during the warm-up phase of the internal combustion engine by the transfer of excess heat from the heating element to the wall is prevented. Conversely, when the electrical heating is disconnected, with the engine at operating temperature, heat transfer from the relatively warm intake manifold or cylinder head to the heating element takes place in order to avoid too strong a cooling of the heating element due to fuel evaporation cooling and convection cooling by the air flow. Any condensation of fuel components on the heating element, even when the internal combustion engine is at operating temperature can in this way reliably be excluded. Furthermore, the holding ribs serve as connection terminals in order to connect the heating element to an electrical power supply. The holding ribs are connected in electrically conductive manner to the printed conductors so as to permit the heating thereof.

The heating element can be provided with a preferably curved surface profile at least on the side facing the fuel which is injected. This has the advantage that the evaporating of the fuel on the heating element is improved due to the enlarged surface which results in an improved heat transfer from the heating element to the fuel components. With a view towards a better eddying of the fuel-air mixture on its way into the combustion chamber of the internal combustion engine, the surface profile may be curved or the entire heating element may be slightly twisted around its longitudinal axis so as to impart a spin to the mixture which avoids a possibly undesired layering of the charge in the combustion chamber. The surface profiling furthermore has the result that the average dwell time of the fuel on the heating element is reliably sufficient for a complete evaporation of the fuel sprayed onto it.

The heating element can have a radius of curvature which is infinitely varied and preferably reduced in the direction of flow and/or can have a trough depth which is infinitely varied and preferably reduced in the direction of flow. Subject to the prerequisite of substantially stationary operation of the engine, it can be advantageous in this connection for the fuel which impinges on the heating element to be initially well protected against the air flow flowing past and to have a sufficiently long time for complete evaporation, the evaporated fuel being thereupon entrained by the air flow in the intake port in the direction towards the internal combustion engine. Such an embodiment furthermore reliably prevents the fuel from being deflected upon impinging the heating element and being deposited on the wall of the port prior to its evaporation. The operating behavior of the cold internal combustion engine benefits from such a design of the heating element. Assuming strongly dynamic engine operation, it can, on the other hand, be advantageous for the dwell-time of the fuel on the heating element to be narrowly limited. Such a condition results from the slim structure of the heating element which promotes flow and the surrounding of the element by flow on all sides which flow is as far as possible undisturbed.

In accordance with one development it can be provided that the heating element extends at an acute angle to the longitudinal axis of the injected fuel jet and forms with the latter an angle $\alpha$ of 1° to 90° and preferably 5° to 45° and that the heating element extends substantially parallel to the flow lines of the intake port. In this way, assurance is had on the one hand that the liquid fuel, upon impinging on the heating element, is deflected essentially only in the direction of the internal combustion engine and the fuel drops burst upon impact. On the other hand, the heating element which extends parallel to the longitudinal axis of the intake port results only in a negligibly small increase in the flow resistance in the intake port so that a good filling of the combustion chambers of the connected internal combustion engine remains assured.

The heating element can be connected in signal-conducting manner to a control device which in turn can consist of the engine control. It is advantageous in this connection for the heating element to be controllable as a function of the engine warm-up condition, which can be described for instance by the temperature of the cooling water and/or engine oil and/or engine components. In addition to a continuous heating of the heating element until reaching the desired engine temperature, the heating element can for instance also be heated in a timed manner. The timing can for instance be governed by the quantity of fuel injected or by the injection time. In order to avoid damage to the heating element, its temperature can for instance be determined by measuring the resistance of the element. When the temperature is outside preset limit values, this irregularity can be displayed on an indicating instrument.

On the side facing the internal combustion engine, the heating element can be tapered. It is an advantage in this connection that the fuel deposited on the heating element collects only at the tip directed towards the engine. An accumulation of fuel components on a broad tear-off edge is thus prevented.

The heating element can be connected to a flange which is part of the intake port, the flange being provided with a conduit through which a heating medium can flow. Particularly in the case of cross-current engines, the period of time which it takes to reach in the intake port a sufficiently high temperature, which is necessary for a good mixture formation, can thereby be reduced. If the electrical current supplied does not make it possible to connect the heating elements during the entire period of time of engine operation, it may be advisable to heat the heating elements by media which have already been heated by the engine such as cooling water, exhaust gas or engine oil. In this case a conduit which extends through the flange longitudinally to the plane of the flange is provided instead of the thermal coupling of the heating elements to the cylinder head realized by means of the suspension of the heating element in the flange. The thermal coupling of the heating elements which takes place in this case to the conduit which is preferably passed through by engine cooling water makes it possible to disconnect the electrical heating of the heating elements a few minutes after the cold starting of the engine. It is advisable to use for the conveying of the heating medium through the above-described conduit a pressure drop which occurs in the engine, so that a separate feed pump for this medium can be avoided.

The maintaining of a specific temperature of the surface of the heating element can take place, in particular upon use of electric heating, as a function of the specific point on the engine operating map both within the meaning of an open-loop control—for instance the heating output as a function of the quantity injected—or else within the meaning of a closed-loop control. Upon closed-loop control, the temperature of the heating element can be controlled either by a separate sensor or, by utilization of the temperature dependence of the electric resistance of an electric conductor, by the heating element itself.

Current measurement takes place with the heating connected and taking into account the terminal voltage in question or by a resistance measurement with the heating being briefly disconnected and an injected current. In this manner, a functional monitoring of the heating elements during engine operation can also be achieved.

In the case of multicylinder engines, one heating element per cylinder can be arranged in the inlet port corresponding to the number of cylinders of the engine. It is advisable to integrate the individual heating elements together with the electrical supply lead in a common intermediate flange. Such a common intermediate flange can in this case for instance be inserted between the cylinder head and the intake manifold of the engine. It may be advisable, in particular upon the use of a plastic intake manifold, to integrate the current feed to the heating elements in the intake manifold and to insert the heating elements upon assembly as individual parts into the correspondingly-shaped electrical contact surfaces of the intake manifold while at the same time achieving good exchangeability. When using an intermediate flange, which is common for several inlet ports, it may be advisable in the case of corresponding structural conditions to integrate parts of the intake manifold such as the receiving surfaces of the injection nozzles into the intermediate flange.

With respect to the electrical supply lead to the heating elements in the flange, it is advisable to produce the heating element as a laminate with the use of a flexible printed conductor with similarly structured electrical supply leads, the heating elements being possibly punched out after carrying out the cementing which takes place in the plane and reforming them into a three-dimensional structure. The overall component, which has been produced in this manner and which consists of heating elements and supply lead, can thereupon for instance be inserted into a mold, and, if necessary, be embedded in plastic by injection molding so that an overall flange is produced which is provided with sealing surfaces and which can be handled easily.

BRIEF DESCRIPTION OF THE DRAWINGS

The intake manifold according to the invention will be explained in greater detail below with reference to the accompanying drawings, in which.

DETAILED DESCRIPTION OF THE DRAWINGS

Figure 1:
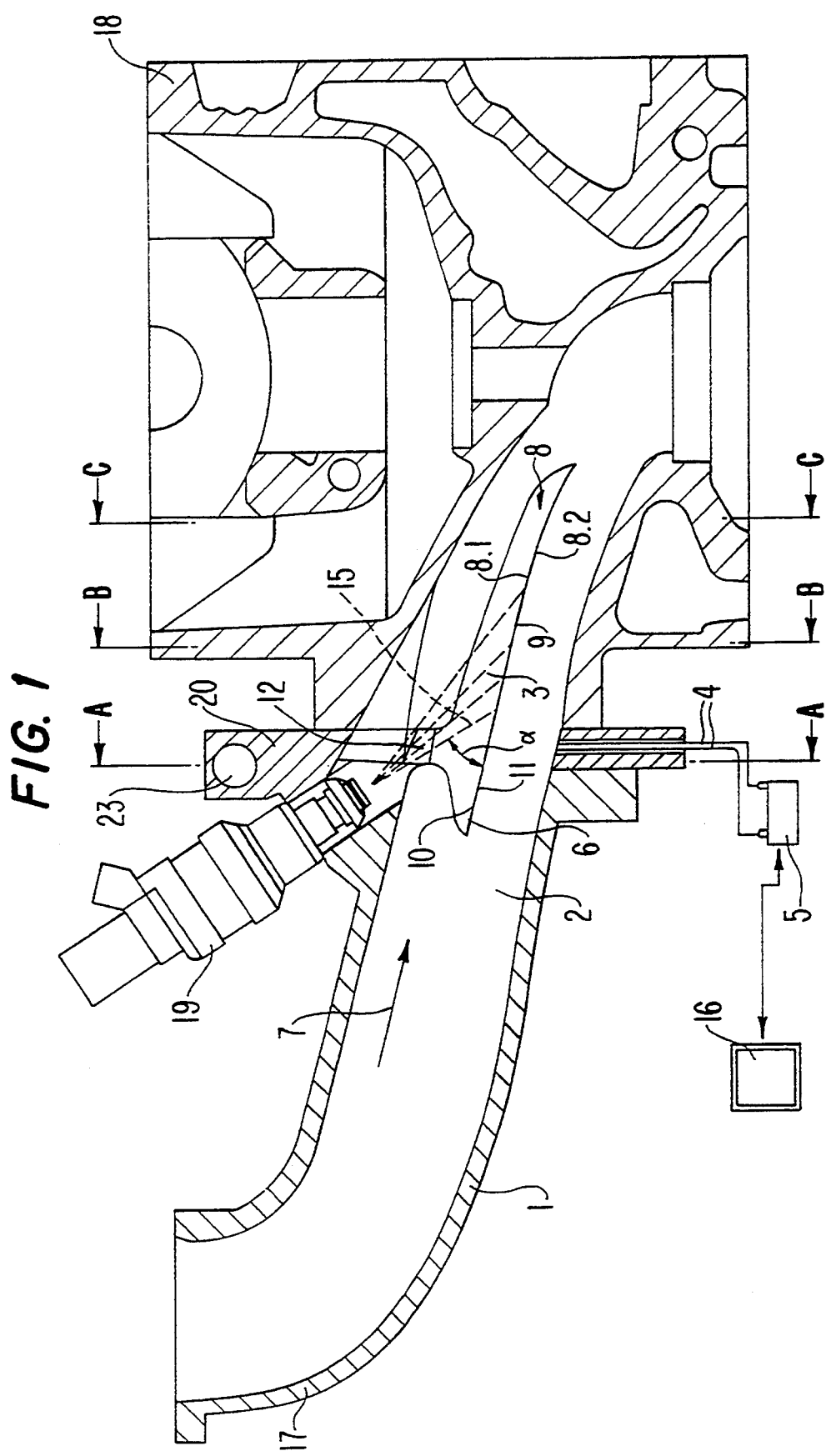
FIG. 1 shows the intake port of an internal combustion engine which comprises one heating element.

FIG. 1 shows an intake manifold 1 for an internal combustion engine having at least one intake port 2, a heating element 3 being arranged within the intake port 2. An intake duct 17 is flanged to the cylinder head 18 of the internal combustion engine, the intake duct 17 being provided with an injection valve 19 which injects fuel into the intake port 2. The heating element 3 is formed by a composite part 6 which is trough-shaped transverse to the direction of flow 7. The heating element 3 is arranged inside the intake port 2 in a manner so that it can be surrounded by flow on all surfaces 8, including upper surface 8.1 and lower surface 8.2 and it can be heated electrically. The terminals 4 are connected to an electric power supply 5. The heating element 3 has a laminate structure, the flexible conductor path 9 of electrically conductive material being covered in these embodiments on both sides by an adhesive film 25, 26 and being arranged between two aluminum sheets 10, 11. The thickness of the aluminum sheets 10, 11 is in this embodiment 0.5 mm, allowing the heating element 3 to be manufactured in simple manner. The initially flat composite part 6 is given a trough-shaped structure by a deep-drawing process, the aluminum sheets 10, 11 passing integrally into each other with holding ribs 12, and the holding ribs 12 being connected to the intermediate flange 20. The flat aluminum sheets 10, 11 can for instance be produced by punching. The heating element 3 is arranged at an angle $\alpha$ to the injected fuel jet 15, the angle being 30° in the case of this embodiment. The heating element 3 extends parallel to the longitudinal axis of the intake port 2 and is connected in a signal-conducting manner to the engine control 16 of the internal combustion engine.

Figure 2:
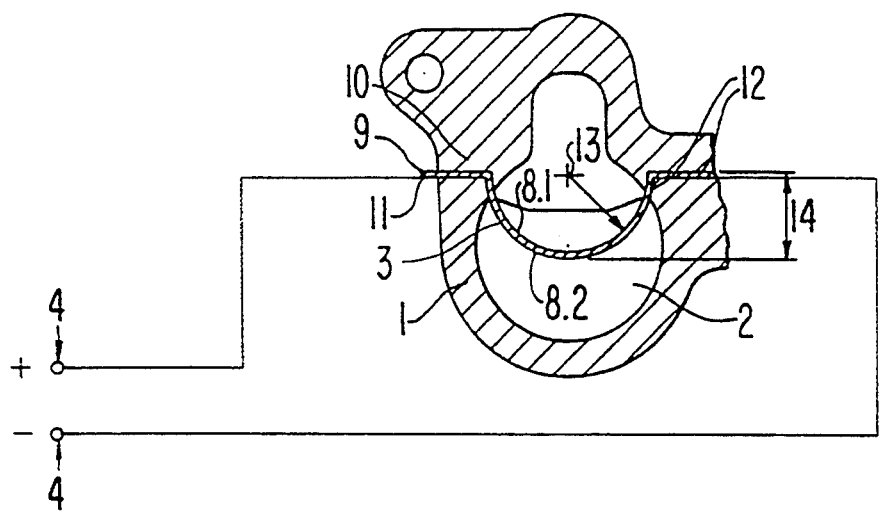
FIGS. 2 to 4 show a cutout of the intake manifold of FIG. 1, the heating device being shown in section along the lines A—A; B—B and C—C.
Figure 2A:
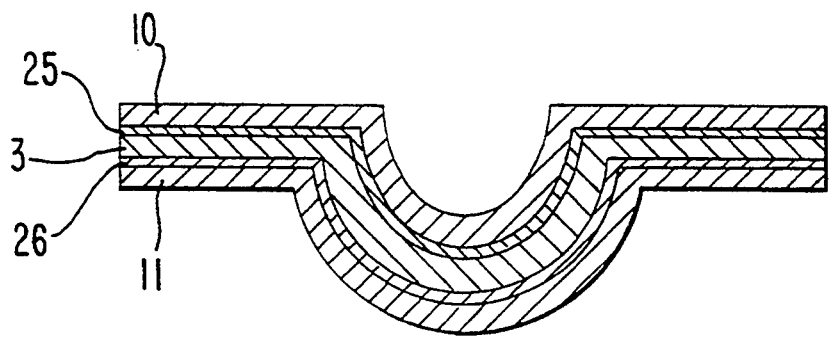
FIG. 2a shows a detailed view of the heating device of the present invention.
Figure 3:
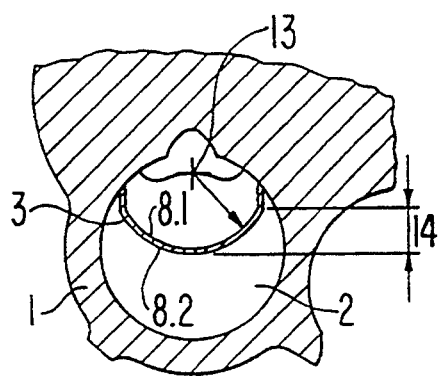
Figure 4:
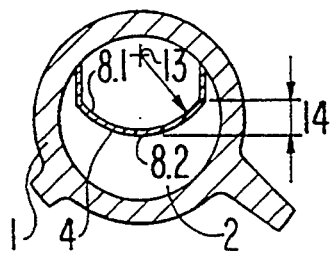

FIGS. 2 to 4 show in each case a section through the heating element 3 of FIG. 1. FIG. 2 shows a section along line A—A of FIG. 1. The trough-shaped cross section and the holding ribs 12 can be clearly noted here, the radius of curvature 13 being of identical size along the entire length of the heating element in the direction of flow 7. This development is advantageous from a manufacturing standpoint. In the region of the holding ribs 12, the heating element 3 has a trough depth 14 which is greater than in the regions which are adjacent in the direction of flow. Particularly during the warm-up phase of the internal combustion engine, the fuel injected through the injection valve 19 can in this way be reliably kept away from the relatively cold wall of the intake port 2, which results in a substantial evaporation of the fuel injected and in an advantageous operating behavior of the internal combustion engine. Along the length of the heating element 3, in the direction towards the combustion chamber of the internal combustion engine, the trough depth 14 is reduced infinitely and continuously.

FIGS. 3 and 4 show the cross section of the heating element 3 along lines B—B and C—C, respectively, of FIG. 1. The ratio of the deepest point of the trough depth 14 to the shallowest point is preferably between 1.1 and 3, and in the case of the preferred embodiment is 2.5. The length-to-width ratio of the heating element 3 is preferably 1.5 to 3 and, in the case of the preferred embodiment is 2.

Figure 5:
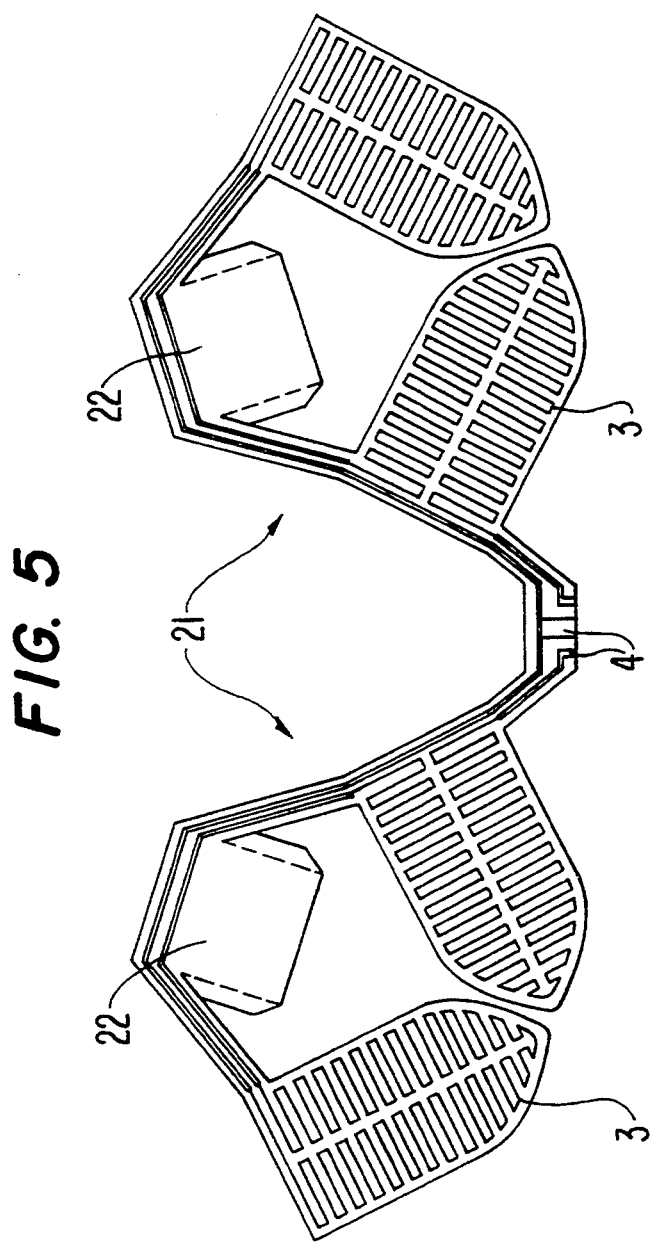
FIG. 5 shows as a development an entire printed conductor as individual part.

The structure of the flexible conductor path 9 of the heating element 3 as an individual part is shown in FIG. 5, the heating element consisting of an electrically conductive material. The dimensions of the printed conductor are adapted to the size of the heating element 3, the current lead to the printed conductor 9 being connected in an electrically conductive manner to the holding ribs 12 of the aluminum sheets 10, 11, which holding ribs are developed as terminals 4.

The entire printed conductor 21 consists in this embodiment of four inter-connected heating elements for an internal combustion engine having four cylinders arranged in line, the individual heating elements 3 being connected to each other by heat-introduction surfaces 22. It is of noteworthy importance that the heating elements 3 are combined in a flange 20 and have together only one current lead via the terminals 4.

Figure 6:
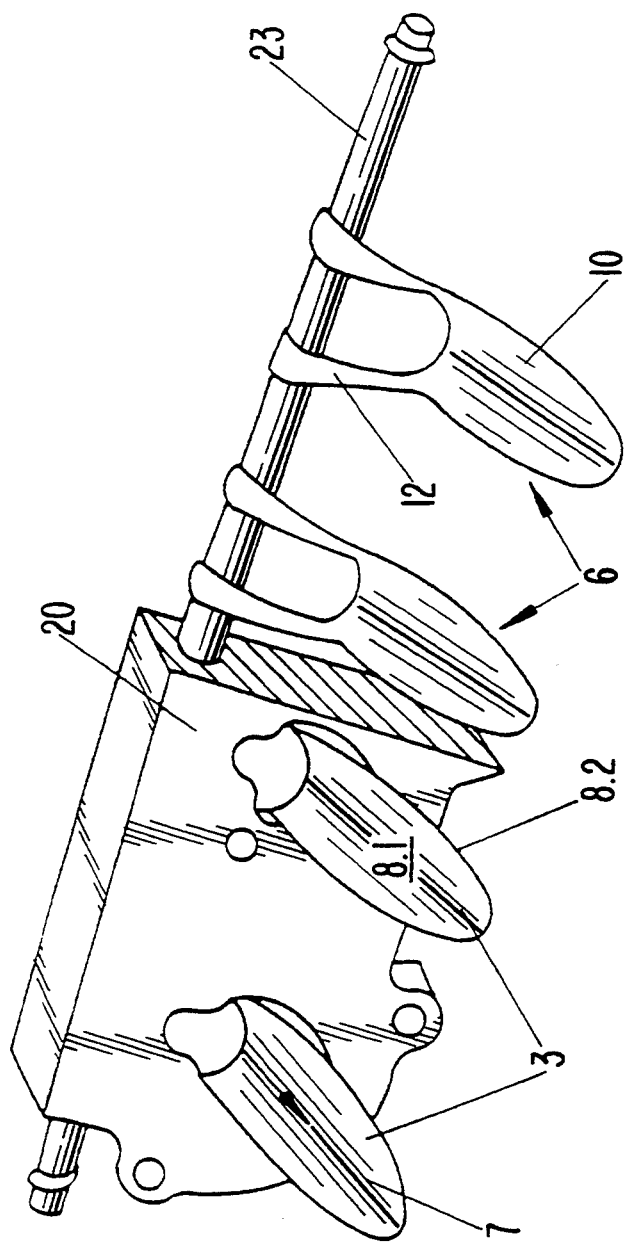
FIG. 6 shows in perspective half-section the four heating elements of a four-cylinder engine integrated into a common intermediate flange.

FIG. 6 is a perspective view of four interconnected heating elements 3, it being possible for the heating elements to be heated in addition to the electrical heating also by media which have already been heated by the engine, in the case of this embodiment by cooling water. It is provided for this purpose that a thermal coupling of the heating elements is realized by a Conduit 23 which extends to the cylinder head along the plane of the flange through the flange 20. It is of advantage in this connection that the electrical heating of the heating elements 3 can be disconnected already a few minutes after the cold starting of the engine and that a medium which has in any event been heated can be utilized for the heating.

Figure 7:
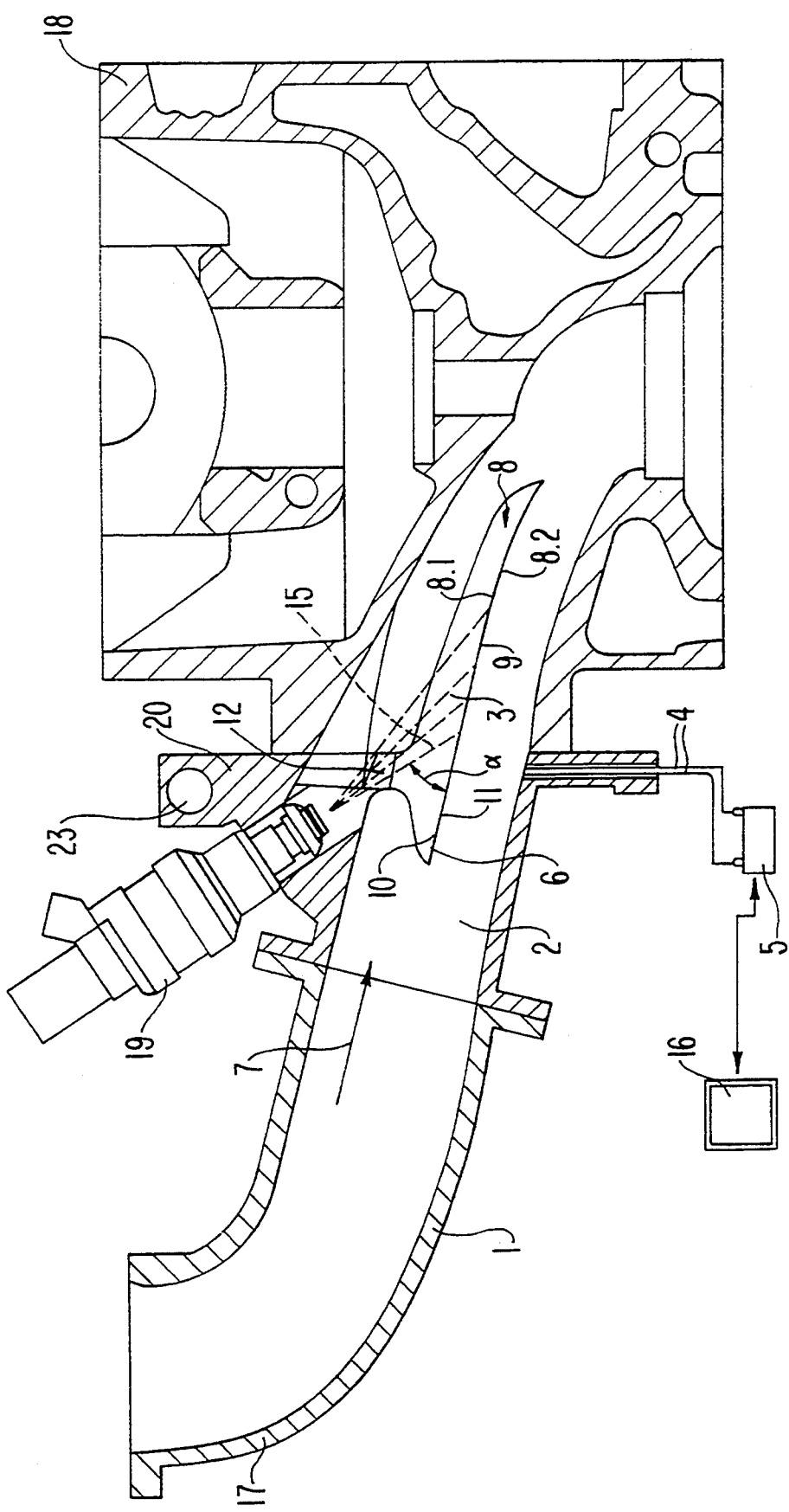
FIG. 7 shows a second embodiment of the intake manifold similar to the embodiment of FIG. 1.

FIG. 7 shows the inlet port of an internal combustion engine similar to FIG. 1. Contrary to the embodiment shown in FIG. 1, the intermediate flange 20 which receives the heating elements 3 is in this case made much wider so that the receiving surfaces of the injection nozzles 19 can be integrated into the flange 20. In addition to the electrical heating, the heating elements 3 can also be heated by media which have already been heated by the engine. Said media, preferably cooling water, are conducted through the conduit 23 shown in section. The heat fed by the medium flowing through the conduit 23 is transferred to the heating elements 3 by means of the holding ribs 12.

We claim:

1. A heating module for an internal combustion engine with fuel injection, said heating module comprising:
an electrically-heatable heating element, said heating element being arranged in an intake port of said internal combustion engine, said heating element having a trough-shaped cross section, said trough-shaped cross section being transverse to a direction of air flow in said intake port, said heating element being constructed of a laminated composite, said laminated composite comprising an outer surface of metallic material and a flexible printed conductor of electrically conductive material, said printed conductor and said metallic material being adhesively connected; and
an electric power supply, said heating element being connected to said electric power supply.

2. A heating module according to claim 1 wherein:
said metallic material comprises two aluminum sheets, each aluminum sheet having a thickness of 0.2 to 1 mm.

3. A heating module according to claim 1 wherein:
said metallic material comprises two copper sheets, each copper sheet having a thickness of 0.2 to 1 min.

4. A heating module according to claim 1 wherein:
said heating element has a curved surface profile on a side facing an injected fuel.

5. A heating module according to claim 1 wherein:
said heating element extends at an angle to a longitudinal axis of an injected fuel jet and forms with said longitudinal axis an angle of approximately 30°, and wherein said heating element extends essentially parallel to air flow lines of said intake port.

6. A heating module according to claim 1 wherein:
said heating element is connected to an engine control.

7. A heating module according to claim 2 wherein:
said laminated composite comprises said flexible printed conductor disposed between said aluminum sheets.

8. A heating module according to claim 3 wherein:
said laminated composite comprises said flexible printed conductor disposed between said copper sheets.

9. A heating module for an internal combustion engine with fuel injection, said heating module comprising:
an electrically-heatable heating element, said heating element being arranged in an intake port of said internal combustion engine, said heating element having a trough-shaped cross section, said trough-shaped cross section being transverse to a direction of air flow in said intake port, said heating element being constructed of a laminated composite, said laminated composite comprising an outer surface of metallic material and a flexible printed conductor of electrically conductive material, said printed conductor and said metallic material being adhesively connected, said metallic material comprising two aluminum sheets, said aluminum sheets comprising integrally formed holding ribs which are fastened to a wall delimiting said intake port; and
an electric power supply, said heating element being connected to said electric power supply.

10. A heating module for an internal combustion engine with fuel injection, said heating module comprising:
an electrically-heatable heating element, said heating element being arranged in an intake port of said internal combustion engine, said heating element having a trough-shaped cross section, said trough-shaped cross section being transverse to a direction of air flow in said intake port, said heating element having a radius of curvature which is infinitely varied in a direction of incoming air flow in said intake port, said heating element being constructed of a laminated composite; and
an electric power supply, said heating element being connected to said electric power supply.

11. A heating module for an internal combustion engine with fuel injection, said heating module comprising:
an electrically-heatable heating element, said heating element being arranged in an intake port of said internal combustion engine, said heating element having a trough-shaped cross section, said trough-shaped cross section being transverse to a direction of air flow in said intake port, said heating element having a trough depth which is infinitely varied, said heating element being constructed of a laminated composite; and
an electric power supply, said heating element being connected to said electric power supply.

12. A heating module for an internal combustion engine with fuel injection, said heating module comprising:
an electrically-heatable heating element, said heating element being arranged in an intake port of said internal combustion engine, said heating element having a trough-shaped cross section, said trough-shaped cross section being transverse to a direction of air flow in said intake port, said heating element being tapered on an end of said heating element facing said internal combustion engine, said heating element being constructed of a laminated composite; and
an electric power supply, said heating element being connected to said electric power supply.

13. A heating module for an internal combustion engine with fuel injection, said heating module comprising:
a conduit through which a heating medium flows;
an electrically-heatable heating element, said heating element being arranged in an intake port of said internal combustion engine, said heating element having a trough-shaped cross section, said trough-shaped cross section being transverse to a direction of air flow in said intake port, said heating element being connected to said conduit in a heat-conducting manner to thereby heat said heating element, said heating element being constructed of a laminated composite; and
an electric power supply, said heating element being connected to said electric power supply.

* * * * *